United States Patent Office 2,956,052
Patented Oct. 11, 1960

2,956,052

5α,6β-DICHLORO-16,17α-EPOXYALLOPREGNANES

John W. Cole and Percy L. Julian, Oak Park, Chappelle C. Cochrane, Maywood, and Bernard M. Regan and Helen C. Printy, Chicago, Ill., assignors, by mesne assignments, to Chas. Pfizer & Co., Inc., New York, N.Y., a corporation of Delaware No Drawing. Filed May 12, 1955, Ser. No. 507,994

5 Claims. (Cl. 260—239.55)

This invention relates to 21-hydroxy steroids and to improvements in the preparation thereof. More particularly, it relates to the preparation of 21-acyloxy-allopregnanes and -pregnenes.

The widespread utilization of cortical hormones, such as cortisone and hydrocortisone, has led to the development of synthetic procedures based on vegetal sterols. These plentiful and readily available raw materials are being utilized to secure products suitable for use in microbiological procedures designed to introduce the desired oxygen-containing functions in ring C of the steroid nucleus. For example, Reichstein's Substance S, 4-pregnene-17α,21-diol-3,20-dione, by microbiological oxidation is converted to the 11α-hydroxy analogue of hydrocortisone. This, in turn, by oxidation of the 11α-hydroxy group to the 11-keto group, yields cortisone. Cortisone can be converted to hydrocortisone by known means.

Reichstein's Substance S, therefore, has become a useful intermediate in the production of cortical hormones. The synthesis of this intermediate from readily available raw materials, described by Julian et al., J.A.C.S., 72, 5145 (1950), has contributed to the practical utilization of the plentiful vegetal steroids in the synthesis of cortisone and hydrocortisone. Accordingly, improvements in the synthesis of Reichstein's Substance S and related products represent valuable and eminently desirable contributions to the art. It is to this end that the present invention is directed.

Another object of this invention is to improve the method of preparation of 16,17-epoxy-4-pregnen-21-ol-2,20-dione acetate.

A still further object is to improve the method of introducing the 21-hydroxy group into 17-acetyl-$\Delta^5$ steroids.

Other objects will be obvious to those skilled in the art from the following description.

In the Julian et al. procedure, referred to hereinabove, 16,17-epoxy-5-pregnen-3β-ol-20-one acetate is converted to the corresponding 21-acetoxy derivative by a series of reactions. Inherent in this group of reactions are several side reactions which act to reduce the yield of the desired product. For example, the 5,6-double bond, which is fortuitously present in the starting material, requires protection prior to proceeding with the introduction of the $C_{21}$ bromo group. Protection by bromination of the said unsaturation is a well-accepted method, due to the relative ease with which the bromine atoms can be removed and the original double bond regenerated. However, as is well known, bromination of ethylenic double bonds leads to a mixture of geometric isomers which differ in the ease of, and behavior upon debromination. Further, as disclosed originally by Mauthner, Monatsh., 15, 91 (1894), and studied most recently by Barton, J.A.C.S., 72, 1066 (1950), 5,6-steroid dibromides undergo mutarotation in solution even at room temperature. Thus, the 5,6-dibromides obtained in the disclosed procedure are a mixture. Further, since in the conversion of the 21-halogeno derivative with alkali metal salts of organic acids to the 21-acyloxy derivatives, such alkali metal salts also react with the 5,6-dibromides, if present, it is necessary to remove the protective bromines prior to replacement of the 21-halogeno group. This is effectively done by the addition of an alkali metal iodide. Such treatment results in the partial replacement of the 21-bromo group by iodo in an acidic medium, with the formation of some hydriodic acid, the presence of which has an additional deleterious effect on the yield of the desired reaction product because of the sensitive nature of the steroid compounds.

We have now found that by the use of chlorine instead of bromine, as a means for protecting the 5,6 double bond during the introduction of the 21-acyloxy group, the yield and facility of introducing the 21-acyloxy group in $\Delta^5$ steroids is improved to a surprising degree. Thus, by the preparation of 5α,6β-dichloro steroids, by the method of Barton, J.A.C.S., 72, 370 (1950), the above-named disadvantages accruing from the mixture of dibromides are avoided. Further, we have found that the trans-5,6-dichloro groups do not react with alkali metal salts of organic acids under the conditions required for the introduction of the 21-acyloxy group, and hence the removal of the said chlorine atoms is not essential at this stage of the process. Thus, the alkali metal iodide treatment, together with the necessity of handling the mixture of 21-bromo and 21-iodo derivatives, is avoided. The deleterious effect of hydriodic acid is likewise avoided by the use of the 5α,6β-dichlorides.

It is obvious from the above that the dichloride procedure permits the shortening of the process to four steps instead of the six required by the dibromide procedure.

Our improved process is carried out by (1) bromination of 5α,6β-dichloro-16,17α-epoxy-allopregnan-3β-ol-20-one, or ester thereof, catalyzed if desired by the presence of a minor amount, less than the stoichiometric requirement to form the bromohydrin, of hydrogen bromide, followed by the hydrolysis of the 3-ester group, if present; (2) replacement of the 21-bromo group by an acyloxy group; and (3) removal of the 5α,6β-dichloro groups, for example, by the method disclosed in co-pending application of Julian and Klein, Serial No. 430,441, filed May 14, 1954, now Patent No. 2,773,867.

Thereafter, this intermediate product can be converted to Reichstein's Substance S acetate, as disclosed in co-pending application of Julian et al., Serial No. 143,146, filed February 8, 1950, now Patent No. 2,816,108, by oxidizing the 3-hydroxyl to keto, conversion of the 16,17-epoxide to the 16-bromo-17α-hydroxy analogue and removal of the 16-bromo group by treatment with Raney nickel.

Alternatively, 5α,6β-dichloro-16,17-epoxyallopregnane-3β,21-diol-20-one 21-acylate can be treated with hydrogen bromide to convert the 16,17-epoxide to the 16-bromo-17α-hydroxy derivative which can be oxidized to the 3,20-dione, and thereafter the 5α,6β-chlorine atoms and the 16-bromo group eliminated as disclosed, for example, in the afore-mentioned copending application of Julian and Klein.

The oxidation of the 3-hydroxyl group can be effected prior to the replacement of the 21-bromo by acyloxy or the said oxidation can be carried out on the bromohydrin of the 21-acyloxy intermediate.

Thus, it can readily be seen that the use of chlorine instead of bromine as a means of protecting the nuclear unsaturation of the sterol nucleus greatly enhances the utility of such sterols in their conversion to Reichstein's Substance S, and related products when used in accordance with the present invention.

The following examples will illustrate the processes of our invention.

*Example 1*

(A) By gentle warming, 0.802 g. of $5\alpha,6\beta$-dichloro-16,17-epoxyallopregnan-$3\beta$-ol-20-one, prepared by chlorination of 16,17-epoxy-5-pregnene-$3\beta$-ol-20-one acetate followed by hydrolysis with KOH, was dissolved in 24 cc. of methylene chloride. To the warm solution, one-half of a solution of 0.35 g. of bromine in 6 cc. of methylene chloride was added. A slow stream of dry hydrogen bromide was bubbled into the mixture for about one minute. The resulting solution was nearly colorless and precipitate formed. The balance of the bromine solution was added, and the mixture permitted to stand for about ten minutes. The slurry was shaken with a solution of 2 g. of sodium acetate in 30 cc. of glacial acetic acid. The solid material dissolved and two layers were obtained. The lower layer of acetic acid was separated, and the methylene chloride layer was washed with water. The solvent was evaporated completely in vacuo, leaving a buff-colored residue melting at 190° to 193° C. The $5\alpha,6\beta$ - dichloro - 16,17 - epoxy - 21 - bromoallopregnan-$3\beta$-ol-20-one produced in this manner was then suspended in 30 cc. of acetone and 3 g. of anhydrous potassium acetate was added. The mixture was heated to and maintained at its boiling point under reflux for three hours. Thereafter, the mass was concentrated to a low volume, and the product obtained by dilution of the mass with water.

*Example 2*

(A) *Bromination of dichloroepoxyallopregnanolone.*— To a solution of 16.6 g. of $5\alpha,6\beta$-dichloro-16,17-epoxyallopregnan-$3\beta$-ol-20-one and 6.7 g. of bromine in 567 cc. of chloroform, 2.7 cc. of methanol containing 0.8 g. of hydrogen bromide was added. The mass was permitted to stand for about 35 minutes at 28° C., after which the reaction started as evidenced by a lightening of the red color of the solution. Three minutes thereafter a precipitate began to form, and the temperature began to rise. The mass was cooled to 28° C. and held there until the bromine color was substantially gone. Thereafter, the slurry was shaken with 5% aqueous sodium bicarbonate containing 0.3 g. of sodium thiosulfate. The solid matter dissolved in the organic layer. The solvent solution was washed with water and then concentrated in vacuo to dryness. The crude product, 28 g., was treated directly as indicated below:

(B) *Replacement of 21-bromo group with acetoxy.*— A mixture of 28 g. of the bromination product from (A) above, 20 g. of fused potassium acetate and 280 cc. of acetone was heated to and maintained at its boiling point for two hours under reflux. The hot slurry was filtered and the filter cake was washed with hot acetone. The combined filtrate and wash was concentrated to a volume of about 130 cc., diluted with water and a seed added. The mass was cooled and the resultant slurry was filtered. The filter cake was washed with water and then dried. The product, 19 g., melting at 163° to 168° C. was recrystallized from ether-petroleum-ether. The melting point of the recrystallized material was 172° to 174° C.

(C) *Oxidation of 21-acetoxy compound.*—A cold, 20° C., solution of 1 g. of the 21-acetoxy compound prepared in (B) above in 30 cc. of 99% acetic acid, was treated with a mixture of 0.2 g. of chromic oxide, 0.5 cc. of water and 5 cc. of glacial acetic acid added over eight minutes. The mass was agitated at 20° C. for one hour, and then after dilution with water the reaction mixture was extracted with ether. The ether extract was washed with successive portions of cold water, 1% aqueous caustic soda and cold water. The washed ether was concentrated to a crystalline slush and the slurry was filtered. The filter cake was washed with cold ether. The product, $5\alpha,6\beta$ - dichloro - 16,17 - epoxyallopregnan - 21 - ol - 3, 20-dione acetate, was recrystallized from ether, M.P. 146° C. dec., and showed no peak in the ultraviolet.

(D) *Dechlorination.*—About 1.0 g. of crude oxidation product obtained as in (C) above was dissolved in 8 cc. of ethyl acetate, and to the solution 2.5 g. of Raney nickel suspended in 6 cc. of methanol was added. The mixture was agitated and heated under reflux for 3½ hours. After separation of the spent catalyst by filtration, the clarified filtrate was extracted with ether, and the ether solution was washed with water and 10% aqueous hydrochloric acid. The washed ethereal solution was permitted to stand for about 16 hours, and thereafter evaporated to dryness. Recrystallization of the crude product from ethyl acetate gave a halogen-free product melting at 163° to 166° C., and when mixed with an authentic specimen of 16,17-epoxy-4-pregnen-21-ol-3,20-dione acetate, M.P. 167° to 169° C., did not depress the melting point thereof. $E_{max}$, 240 M=16,600.

Treatment of this product with HBr results in the formation of 16-bromo-4-pregnene-$17\alpha$,21-diol-3,20-dione acetate, which on treatment with Raney nickel yields compound S acetate.

*Example 3*

Dry hydrogen bromide was bubbled into a 20° C. solution of 6.0 g. of $5\alpha,6\beta$-dichloro-16,17-epoxyallopregnane-$3\beta$,21-diol-20-one 21-acetate, in 60 cc. of methylene chloride, for about 12 minutes. The mass heated spontaneously to 26° C. The resultant slurry was filtered, and the filter cake of bromohydrin was washed with methylene chloride and with carbon tetrachloride. The washed cake was dried to constant weight.

6.6 g. of white crystalline product, melting at 170° to 172° C. dec., were obtained.

Oxidation with chromic acid in the usual manner gave a product melting at 170° C. dec., which depressed the melting point of the original bromohydrin and which gave no peak in the ultraviolet.

Analysis for $C_{23}H_{31}O_5BrCl_2$: Halogen equivalents/gram.—Theory .0054. Found .0055.

A mixture of 7 g. of Raney nickel, 50 cc. of methanol and 1.7 g. of the $5\alpha,6\beta$-dichloro-16-bromoallopregnane-$17\alpha$,21-diol-3,20-dione 21-acetate was agitated for about 30 minutes to permit the initial reactivity to subside. Thereafter, the mixture was agitated and heated under reflux for three hours. The mixture was filtered, and the spent catalyst washed with warm methanol and ether. The filtrate was extracted with ether, water and 10% aqueous hydrochloric acid. Thereafter, the slightly acidic ether solution was permitted to stand for about 16 hours. The mass was washed with water, 1% aqueous caustic soda and finally with water. The washed solution was concentrated to a crystalline slush and then filtered. The filter cake of Reichstein's Substance S acetate was dried and the dried material, halogen free, melted at 232° to 234° C. A second crop, M.P. 225° to 230° C., is obtained from the original mother liquor. A total of 1.15 g., 94% of the theoretical amount obtainable, is produced in this fashion.

*Example 4*

In order to demonstrate that the 21-bromination of $5\alpha,6\beta$-dichloro-16,17-epoxy-allosteroids will occur without the addition of catalytic amounts of hydrogen bromide, the following experiment was carried out:

A solution of 6.0 grams of $5\alpha,6\beta$-dichloro-16,17-epoxy-allopregnan-$3\beta$-ol-20-one, in 120 ml. of methylene chloride, was agitated during the portionwise addition of a solution of 2.4 g. of bromine in 30 ml. of methylene chloride and 1.5 ml. of methanol. The course of the bromination is indicated as follows:

| Time | Addition | Color of Mixture |
| --- | --- | --- |
| 0 | 0.6 ml. methanol<br>0.6 ml. bromine solution | Orange. |
| 10 min | 0.9 ml. methanol | Colorless. |
| 11 min | 1 ml. bromine solution | Orange. |
| 19 min | | Light Yellow. |
| 19 to 29 min | 6.6 ml. bromine solution added dropwise. | Deep to Light Yellow. |
| 29 to 34 min | 9.6 ml. bromine solution added dropwise. | Light to Pale Yellow. |
| 34 to 37 min | 6.5 ml. bromine solution added | Light Yellow. |
| 37 to 44 min | 6.3 ml. bromine solution added | Medium to Deep Yellow. |
| 49 min | | Light Yellow (Light Crystalline Precipitate). |

Thereafter, the mixture was shaken with 30 ml. of a 0.5 molar aqueous sodium bicarbonate solution during which the solid which had begun to appear dissolved. The excess bromine was removed by shaking the solvent solution with 0.5 ml. of 0.5 molar aqueous sodium sulfite. The methylene chloride layer was separated and evaporated to dryness in vacuo.

To the residue thus obtained, 12 g. of anhydrous potassium acetate and 120 ml. of acetone were added. The mixture was heated to and maintained at its boiling point under reflux for 1½ hours. After being cooled, 150 ml. of methylene chloride and 50 ml. of water were added. The aqueous phase was drawn off and discarded. The solvent layer was concentrated to a small volume and diluted with 50 ml. of hot methanol. The resultant mixture was concentrated to incipient crystallization, after which it was cooled to about 27° C. The resultant thick slurry was filtered and washed with methanol. The washed cake was dried in a 65° C. oven. Thusly, 5.2 g. of 5α,6β-dichloro-16,17-epoxyallopregnane - 3β,21 - diol-20-one 21-acetate, 75.5% of the theoretical amount obtainable, was prepared. The product melted at 174° to 176° C.

In an analogous experiment, 200 g. of the dichloro epoxide was dissolved in 4 liters of methylene chloride. In rapid succession, 80 g. of bromine and 40 ml. of a methanol solution of hydrogen bromide containing 0.10 g. HBr/ml. were added. After fifteen minutes, the reaction was definitely under way as evidenced by a distinct lightening of the solution. The mass was worked up in substantially the same manner as indicated above. The entire crude 21-bromo product was converted to the 21-acetoxy derivative in the usual manner. Thusly, 201 g. of product, M.P. 174° to 177° C., was obtained. This represents a yield of 87% of the theoretical amount obtainable.

*Example 5*

To a solution of 6.0 g. of 5α, 6β-dichloro-16,17-epoxyallopregnan-3β-ol-20-one acetate in 120 cc. of methylene chloride containing 0.5 cc. of methanol, 2.4 g. of bromine dissolved in 30 cc. of methylene chloride was added dropwise. The bromine addition was interrupted after the first cc. and was not resumed until the initial color was discharged, about 15 minutes, indicating the bromination had started. After all the bromine had been added, the mixture was agitated for three minutes to complete the reaction.

Thereafter, the mass was shaken with 30 cc. of 0.5 M aqueous sodium bicarbonate and the excess bromine was discharged by shaking with about 20 cc. of 0.5 M aqueous sodium sulfite. The colorless solution was washed with water and then evaporated to dryness in vacuo.

The residue was heated to and maintained boiling under reflux for 1½ hours with 120 cc. of acetone and 12 grams of anhydrous potassium acetate. The resulting mass was mixed with 150 cc. of methylene chloride and 50 cc. of water. After separation of the aqueous layer, the solvent layer was evaporated to dryness in vacuo. The residue was heated on a steam bath with 15 cc. of acetic anhydride and 45 cc. of pyridine for one hour, and the resulting dark brown solution was permitted to stand for about 16 hours. The product was watered out, and after being filtered was washed well with water and dried. The crude diacetate, amounting to 6.5 g., 99% theory, melted at 167° to 170° C. After one recrystallization from methylene chloride-ether, the product melted at 175° to 176° C.

Acetylation of the 3-hydroxy product of Example 4 gave the identical product, M.P. 175° to 176° C., with no depression in melting point upon admixture of the two.

Halogen analysis, for $C_{25}H_{34}O_6Cl_2$: percent chlorine—Calc. 14.17%. Found 14.38%.

It will be readily seen from the foregoing examples that an improved means has been provided for the preparation of 21-bromo steroids from which the 21-acyloxy steroids are obtained. Further, the overall process for the synthesis of Reichstein's Substance S, from vegetal steroids, has been thereby improved and simplified. These improvements and others which should be obvious to the skilled artisan, follow from the surprising discovery of the greater stability of the trans-dichlorides compared to the mixture of isomeric dibromides, which are used to protect the 5,6 double bond of the cyclopentanopolyhydrophenanthrene nucleus. Our invention, moreover, is not limited to the specific compounds enumerated but is broadly applicable to utilization of 5α,6β-dichloro - 10,13 - dimethyl - 16,17α - epoxy - 17β - monobromo-acetyl-cyclopentanopolyhydrophenanthrenes of the $C_{21}$ series in synthesis of valuable compounds containing the ketol side chain attached to the 17-position of the steroid nucleus. The compounds can bear other nuclear substituents, such as halogeno, keto, hydroxyl, or a group readily convertible to hydroxyl as, for example, by hydrolysis in such positions of the nucleus at the 2, 3, 7, 11, 12 and/or 14.

Where hydroxyl substituents are present initially, either the free hydroxy or an acyl ester thereof can be used. Any acyl ester can be used, as, for example, those obtainable from acetic, propionic, heptanoic, benzoic, phthalic, succinic, naphthoic, picolinic, and the like, acids.

The replacement of the 21-bromo group by acyloxy is effected by treatment of the 21-bromo compound with an alkali metal salt of a lower carboxylic acid in the manner known in the art. The replacement of the 21-bromo group by hydroxy can be effected by treatment with a formate salt in accordance with the method disclosed in co-pending application of Julian et al., Serial No. 323,701, filed December 2, 1952.

In the above examples, reference has been made to a solid appearing toward the completion of the bromination reaction. It is preferred to treat this mixture with weakly alkaline materials, e.g., sodium acetate, sodium bicarbonate and the like. The completeness of such a treatment is usually indicated by the dissolution of all of the solid product.

We have now disclosed a novel, improved procedure for the preparation of steroids of the $C_{21}$ series, which possess a ketol side chain attached to the 17-position of the nucleus. Our disclosure has been amplified by several examples illustrating the basic nature of our invention, together with reference at several points in the above specification to numerous variations thereof which show the scope of our invention. Obviously, other variations will be apparent to the skilled chemist, and it is to be understood that such are intended to be included within the scope of our invention, which is defined and limited only by the appended claims.

Having described the invention, what is claimed is:

1. 5α,6β-dichloro - 16,17α - epoxy - 21 - bromo - allopregnane-3β-ol-20-one.
2. The 21-lower carboxylic acid esters of 5α,6β-dichloro-16,17α-epoxyallopregnane-3β-21-diol-20-one.
3. 5α,6β-dichloro-16,17α - epoxyallopregnane - 3β,21-diol-20-one 21-acetate.
4. The lower carboxylic acid esters of 5α,6β-dichloro-16,17α-epoxyallopregnane-21-ol-dione-3,20.
5. 5α,6β-dichloro-16,17α-epoxyallopregnane - 21 - ol-3,20-dione acetate.

References Cited in the file of this patent

UNITED STATES PATENTS

| | | |
|---|---|---|
| 2,369,065 | Marker | Feb. 6, 1945 |
| 2,609,379 | Ruschig | Sept. 2, 1952 |
| 2,667,498 | Julian et al. | Jan. 26, 1954 |
| 2,686,181 | Julian | Aug. 10, 1954 |
| 2,688,624 | Moffett | Sept. 7, 1954 |
| 2,691,013 | Moffett | Oct. 5, 1954 |
| 2,752,339 | Julian et al. | June 26, 1956 |
| 2,759,929 | Farrar et al. | Aug. 21, 1956 |
| 2,773,867 | Julian et al. | Dec. 11, 1956 |
| 2,786,837 | Farrar et al. | Mar. 26, 1957 |
| 2,786,856 | Culter et al. | Mar. 26, 1957 |
| 2,789,989 | Julian et al. | Apr. 23, 1957 |